United States Patent
Yamada et al.

(10) Patent No.: US 9,555,496 B2
(45) Date of Patent: Jan. 31, 2017

(54) PROCESS FOR PRODUCING WELDED JOINT USING GMA WELDING AND $CO_2$ AS A SHIELDING GAS

(71) Applicant: NIPPON STEEL & SUMITOMO METAL CORPORATION, Tokyo (JP)

(72) Inventors: Kenta Yamada, Tokyo (JP); Masahiko Hamada, Tokyo (JP); Daisuke Motoya, Tokyo (JP); Shinjiro Nakatsuka, Tokyo (JP); Hisashi Amaya, Tokyo (JP); Hideki Takabe, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 106 days.

(21) Appl. No.: 14/388,836

(22) PCT Filed: Mar. 27, 2013

(86) PCT No.: PCT/JP2013/058954
§ 371 (c)(1),
(2) Date: Sep. 29, 2014

(87) PCT Pub. No.: WO2013/146860
PCT Pub. Date: Oct. 3, 2013

(65) Prior Publication Data
US 2015/0056005 A1    Feb. 26, 2015

(30) Foreign Application Priority Data

Mar. 30, 2012 (JP) .................................. 2012-082023

(51) Int. Cl.
*B23K 35/30*    (2006.01)
*B23K 35/38*    (2006.01)
(Continued)

(52) U.S. Cl.
CPC .................. *B23K 9/23* (2013.01); *B23K 9/025* (2013.01); *B23K 9/028* (2013.01); *B23K 9/173* (2013.01);
(Continued)

(58) Field of Classification Search
CPC .............. B23K 35/0288; B23K 35/302; B23K 35/3053; B23K 35/308; B23K 35/3086; B23K 35/38; B23K 9/025; B23K 9/028; B23K 9/173; B23K 9/23; B23K 35/383; B23K 2203/04; B23K 2203/05
See application file for complete search history.

(56) References Cited

U.S. PATENT DOCUMENTS 4,499,158 A * 2/1985 Onuma .............. B23K 35/3086
                                                              415/200
6,042,782 A * 3/2000 Murata .............. B23K 35/3086
                                                              219/146.23
(Continued)

FOREIGN PATENT DOCUMENTS

DE    695 00 831      2/1998
JP    53-127336      11/1978
(Continued)

OTHER PUBLICATIONS

Machine translation of Japan Patent document No. 07-009,144, Apr. 2016.*

*Primary Examiner* — Geoffrey S Evans
(74) *Attorney, Agent, or Firm* — Clark & Brody

(57) ABSTRACT

A process for producing a welded joint, which includes a weld metal having high strength and high toughness, and containing fewer blowholes, includes the steps of: preparing a base material containing, by mass %, not less than 10.5% of Cr; and subjecting the base material to GMA welding using a shielding gas containing 1 to 2 volume % or 35 to 50 volume % of $CO_2$ gas, and the balance being inert gas, (Continued)

thereby forming a weld metal includes, by mass %, C: not more than 0.080%, Si: 0.20 to 1.00%, Mn: not more than 8.00%, P: not more than 0.040%, S: not more than 0.0100%, Cu: not more than 2.0%, Cr: 20.0 to 30.0%, Ni: 7.00 to 12.00%, N: 0.100 to 0.350%, O: 0.02 to 0.11%, sol. Al: not more than 0.040%, at least one of Mo: 1.00 to 4.00% and W: 1.00 to 4.00%, and the balance being Fe and impurities.

10 Claims, 4 Drawing Sheets

(51) Int. Cl.
| | |
|---|---|
| B23K 9/23 | (2006.01) |
| B23K 9/173 | (2006.01) |
| C22C 38/18 | (2006.01) |
| C22C 38/58 | (2006.01) |
| B23K 35/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/54 | (2006.01) |
| B23K 9/025 | (2006.01) |
| B23K 9/028 | (2006.01) |
| C22C 38/46 | (2006.01) |
| F16B 13/00 | (2006.01) |
| C22C 38/40 | (2006.01) |

(52) U.S. Cl.
CPC ......... *B23K 35/0288* (2013.01); *B23K 35/302* (2013.01); *B23K 35/308* (2013.01); *B23K 35/3053* (2013.01); *B23K 35/3086* (2013.01); *B23K 35/38* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/18* (2013.01); *C22C 38/42* (2013.01); *C22C 38/44* (2013.01); *C22C 38/46* (2013.01); *C22C 38/54* (2013.01); *C22C 38/58* (2013.01); *F16B 13/00* (2013.01); *B23K 35/383* (2013.01); *B23K 2201/06* (2013.01); *B23K 2201/10* (2013.01); *B23K 2201/18* (2013.01); *B23K 2203/04* (2013.01); *B23K 2203/05* (2015.10); *C22C 38/40* (2013.01); *Y10T 403/479* (2015.01)

(56) References Cited

U.S. PATENT DOCUMENTS

| | | | | |
|---|---|---|---|---|
| 6,596,971 | B1 * | 7/2003 | Biskup | B23K 9/173 219/137 WM |
| 2001/0027966 | A1 * | 10/2001 | Iwatsubo | B23K 35/383 219/137 WM |
| 2002/0148533 | A1 * | 10/2002 | Kim | B23K 35/368 148/24 |
| 2007/0170164 | A1 * | 7/2007 | Nadzam | B23K 9/092 219/130.51 |
| 2013/0316193 | A1 * | 11/2013 | Nagayama | C22C 38/001 428/684 |

FOREIGN PATENT DOCUMENTS

| | | | |
|---|---|---|---|
| JP | 62-286677 | | 12/1987 |
| JP | 05-132741 | | 5/1993 |
| JP | 07-9144 | | 1/1995 |
| JP | 07-009144 A | * | 1/1995 |
| JP | 08-260101 | | 10/1996 |
| JP | 2001-009589 | | 1/2001 |
| JP | 2006-026651 | | 2/2006 |
| JP | 2007-245225 | | 9/2007 |
| WO | 98/10888 | | 3/1998 |
| WO | 2008/026594 | | 3/2008 |
| WO | 2011/030709 | | 3/2011 |
| WO | WO-2012/111535 A | * | 8/2012 |

* cited by examiner

PROCESS FOR PRODUCING WELDED JOINT USING GMA WELDING AND $CO_2$ AS A SHIELDING GAS

TECHNICAL FIELD

The present invention relates to a process for producing a welded joint, and a welded joint.

BACKGROUND ART

Recently, in oil-related industry applications, there have been demands for steel materials which have excellent strength, in addition to being corrosion resistant. As a steel material having high strength, a high nitrogen duplex stainless steel disclosed in JP5-132741A (Patent Literature 1), and a martensitic stainless steel containing 12 to 13 mass % of Cr disclosed in WO2008/026594 (Patent Literature 2) have been put into use.

When producing a welded joint which uses such a high strength stainless steel as the base material, high strength is also required for the weld metal. Further, high toughness is also required for the weld metal.

Meanwhile, among various welding methods, gas shielded arc welding provides good welding properties. Accordingly, the gas shielded arc welding has been utilized for the welding of various steel materials. The gas shielded arc welding includes a GTA (Gas Tungsten Arc) welding method and a GMA (Gas Metal Arc) welding method. The GTA welding method, which is also called a non-consumable type gas shielded arc welding, principally melts the base material with tungsten as the electrode to achieve joining. The GMA welding method, which is also called a consumable electrode type gas shielded arc welding, uses a welding consumable as the electrode.

Generally, the GTA welding method is applied for the welding of stainless steel. This is because the GTA welding method facilitates forming high quality weld metal. JP2001-3589A (Patent Literature 3) and JP8-260101 (Patent Literature 4) propose GTA welding which uses a high-nitrogen similar-metal welding material to obtain weld metal having high strength and high toughness.

DISCLOSURE OF THE INVENTION

However, the welding speed of the GTA welding method is slow, and so the welding efficiency thereof is low. In contrast, the welding speed of the GMA welding method is higher than that of the GTA welding method. Therefore, to increase welding efficiency, it is preferable to apply the GMA welding method in place of the GTA welding method.

However, since the solidification rate of weld metal is higher in the GMA welding method compared with in the GTA welding method, defects called blowholes are more likely to occur in the weld metal.

It is an object of the present invention to provide a process for producing a welded joint which includes a weld metal having high strength and high toughness, and containing fewer blowholes.

A process for producing a welded joint according to the present embodiment comprises the steps of: preparing a base material comprising, by mass %, not less than 10.5% of Cr; and subjecting the base material to GMA welding using a shielding gas comprising 1 to 2 volume % or 35 to 50 volume % of $CO_2$, and the balance being inert gas, thereby forming a weld metal comprising, by mass %, C: not more than 0.080%, Si: 0.20 to 1.00%, Mn: not more than 8.00%, P: not more than 0.040%, S: not more than 0.0100%, Co: not more than 2.0%, Cr: 20.0 to 30.0%, Hi: 7.00 to 12.00%, N: 0.100 to 0.350%, O: 0.02 to 0.14%, sol. Al: not more than 0.040%, at least one of Mo: 1.00 to 4.00% and 1.00 to 4.00%, and the balance being Fe and impurities.

A welded joint according to the present embodiment comprises a base material and a weld metal. The base material comprises, by mass %, not less than 10.5% of Cr. The weld metal comprises, by mass %, C: not more than 0.080%, Si: 0.20 to 1.00%, Mn: not more than 8.00%, P: not more than 0.040%, S: not more than 0.0100%, Cu: not more than 2.0%, Cr: 20.0 to 30.0%, Ni: 7.00 to 12.00%, H: 0.100 to 0.350%, O: 0.02 to 0.14%, sol. Al: not more than 0.040%, at least one of Mo: 1.00 to 4.00% and W: 1.00 to 4.00%, and the balance being Fe and impurities. In the weld metal, the number of blowholes having a size of not less than 0.5 mm is not more than 5 pieces/100 mm.

BEST MODE FOR CARRYING OUT THE INVENTION

Hereafter, embodiments of the present invention will be described in detail. The symbol relating to an element of chemical composition means mass %, unless otherwise stated.

The present inventors have conducted various experiments and detailed studies on weld metal when producing a stainless welded joint by GMA welding, and obtained the following findings.

(A) To achieve high strength, the weld metal is preferably a duplex stainless steel. Further, the nitrogen content of the weld metal is preferably as high as 0.100 to 0.350%. Higher N content will increase the strength of the weld metal, and thereby the welded joint can achieve excellent strength.

(B) However, when the weld metal is produced by GMA welding, higher nitrogen content of the weld metal will make blowholes more likely to occur. This is presumably because the nitrogen gas generated in the weld metal remains in the weld metal even after cooling without being discharged to the outside, thereby forming blowholes. Therefore, particularly when a high-nitrogen weld metal is formed by GMA welding, blowholes are more likely to occur compared with an ordinary low-nitrogen weld metal.

(C) To produce weld metal made or the above described high-nitrogen duplex stainless steel, GMA welding is conducted by using a shielding gas comprising 1 to 2 volume or 35 to 50 volume % of $CO_2$, and the balance being inert gas. In this case, the occurrence of blowholes is reduced, and a weld metal having high strength and high toughness is obtained. Hereafter, detailed description will follow.

Figure 1:
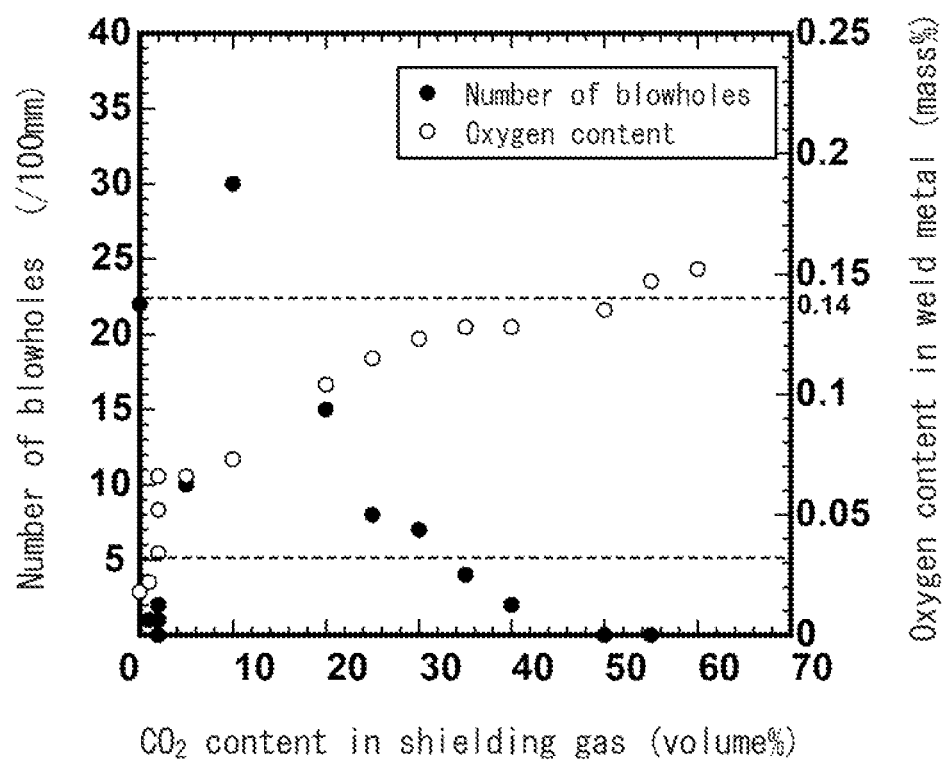
FIG. 1 is a diagram showing the number of blowholes (/100 mm) and oxygen content (%) in weld metal with respect to the content (volume %) of $CO_2$ gas in the shielding gas when the weld metal is produced by GMA welding.

FIG. 1 is a diagram showing the number of blowholes (/100 mm) and oxygen content (%) in the weld metal, with respect to the content of $CO_2$ gas (volume %) in the shielding gas when the weld metal is produced by GMA welding. FIG. 1 has been obtained in the following way.

A plurality of shielding gases comprising various volume ratios of $CO_2$, and the balance being Ar, which is an inert gas, were prepared. GMA welding was conducted by using each shielding gas to produce a welded joint including weld metal made of a high-nitrogen duplex stainless steel having the above described chemical composition. As the base material, a martensitic stainless steel or a duplex stainless steel, which was within the range of the chemical composition to be described below, was used.

The number of blowholes in the weld metal of a welded joint thus produced was counted by the below described method. Further, the oxygen content in the weld metal thus produced was determined by a gas analysis method based on JIS Z2613 to obtain FIG. 1.

The horizontal axis in FIG. 1 represents the content of $CO_2$ (volume %) in the shielding gas. The symbol "●" in FIG. 1 indicates the number of blowholes (/100 mm) in the weld metal. The symbol "○" indicates the oxygen content (mass %) in the weld metal.

Referring to FIG. 1, when the shielding gas contained Ar alone without $CO_2$, a large number of blowholes existed. On the other hand, when the content of $CO_2$ in the shielding gas was 1 to 2 volume %, the number of blowholes sharply decreased to be not more than 5 pieces/100 mm. Further, as the volume ratio of $CO_2$ in the shielding gas increased, the number of blowholes sharply increased again. However, when the volume ratio of $CO_2$ was not less than 10%, the number of blowholes sharply decreased again as the volume ration of $CO_2$ increased. Then, when the amount of $CO_2$ was not less than 35 volume %, the number of blowholes decreased again to be not more than 5 pieces/100 mm.

Such a phenomenon occurred presumably because the volume ratio of $CO_2$ in the shielding gas influenced the stability of arc and the viscosity of the weld metal. To be specific, when the amount of $CO_2$ was 1 to 2 volume %, the arc was stabilised so that the occurrence of blowholes was reduced. When the amount of $CO_2$ was more than 2 volume %, the arc was destabilized so that blowholes sharply increased. However, when the amount of $CO_2$ exceeded 10 volume %, the carbon (C) content contained in the weld metal increased as the amount of $CO_2$ increased. Thus, the viscosity in the weld metal decreased so that bubbles produced during melting was likely to be released to the outside. As a result, the number of blowholes decreased again. Then, when the amount of $CO_2$ was not less than 35 volume %, the number of blowholes again was not more than 5 pieces/100 mm.

As so far described, when the volume ratio of $CO_2$ in the shielding gas is 1 to 2%, or not less than 35%, the number of blowholes in weld metal will be reduced to be as low as not more than 5 pieces/100 mm.

Figure 2:
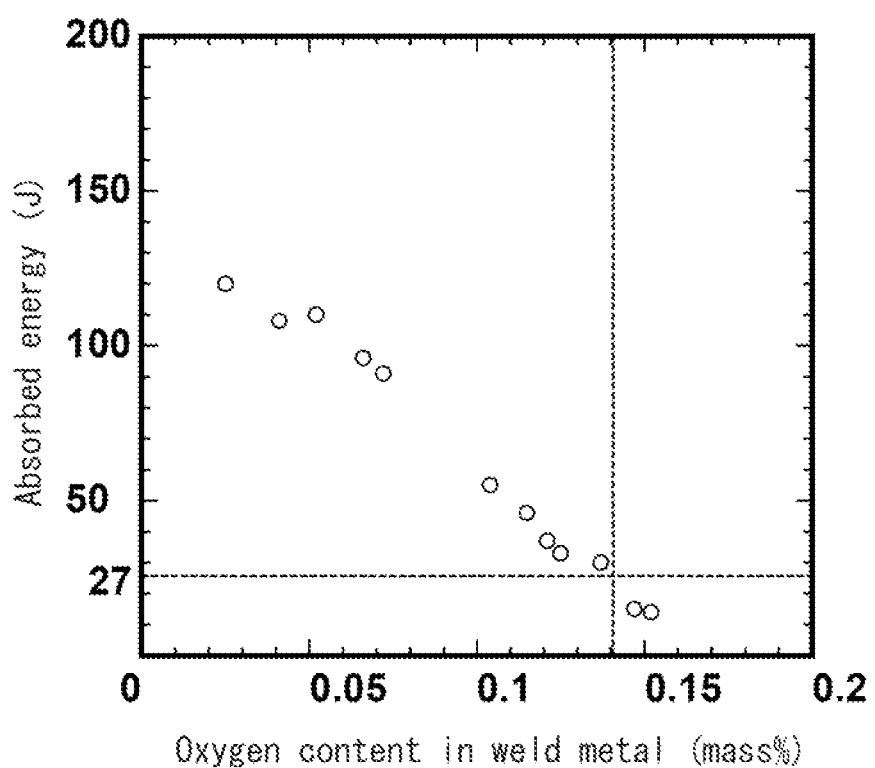
FIG. 2 is a diagram showing the relationship between the oxygen content (%) in the weld metal and absorbed energy (J) at −30° C.

To obtain weld metal which not only has few blowholes, but also has excellent toughness, it is preferable that the volume ratio of $CO_2$ in the shielding gas is not more than 50%. FIG. 2 is a diagram showing the relationship between the oxygen content (%) and absorbed energy (J) at $-30°$ C. of the weld metal in each welded joint produced in the test shown in FIG. 1. FIG. 2 is obtained by conducting a Charpy impact test to be described below.

Referring to FIG. 2, the absorbed energy of weld metal decreased as the amount of oxygen in the weld metal increased. As a result of observing the fracture surface, since a ductile fracture surface was confirmed, the decrease in the absorbed energy was not attributable to embrittlement, but was presumably caused by oxygen in the weld metal. It may be assumed that when the amount of oxygen in the weld metal increases, the generated amount of oxides, which act as a starting point of fracture, increases, thereby reducing absorbed energy.

If the absorbed energy at $-30°$ C. is not less than 27 J, it can be concluded that the weld metal has excellent toughness sufficient for practical uses. Referring to FIG. 2, when the oxygen content of the weld metal is not more than 0.14%, the absorbed energy will be not less than 27 J. The oxygen content in the weld metal depends on the $CO_2$ content in the shielding gas during GMA welding. Referring to "o" in FIG. 1, when the content of $CO_2$ in the shielding gas is not more than 50%, the oxygen content in the produced weld metal will be not more than 0.14%, and thus excellent toughness will be obtained.

Thus, conducting GMA welding by using a shielding gas which comprises 1 to 2 volume % or 35 to 50 volume % of $CO_2$, and the balance being inert gas, will reduce the occurrence of blowholes, making it possible to produce a welded joint including a weld metal having high strength and high toughness.

Based on the findings described so far, the process for producing a welded joint according to the present embodiment has been completed. Hereafter, the process for producing a welded joint will be described.

[Production Method]

A welded joint comprises a base material and weld metal. A welded joint refers to, for example, a structure in which end portions of steel pipes or steel, plates are welded together. The steel pipe may be a seamless steel pipe or a welded steel pipe.

A process for producing a welded joint according to the present embodiment comprises a step of preparing a base material (preparation step), and a step of conducting GMA welding on the base material (welding step).

[Preparation Step]

A base material comprising, by mass %, not less than 10.5% of Cr is prepared. The reason why the Cr content is made to be not less than 10.5% is to achieve corrosion resistance. Preferably, the base material is a martensitic stainless steel or a duplex stainless steel.

[Case in which the Base Material is Martensitic Stainless Steel]

When the base material is a martensitic stainless steel, preferably the base material has the following chemical composition.

C: 0.001 to 0.100%

Carbon (C) increases the strength of steel. However, when the C content is too high, the hardness of welding heat affected zone after welding will be too high, thereby reducing toughness and stress corrosion cracking resistance. Therefore, the C content is 0.001 to 0.100%. The lower limit of the C content is preferably 0.002%, and more preferably 0.003%. The upper limit of the C content is preferably 0.07%, and more preferably 0.05%.

Si: 0.050 to 1.00%

Silicon (Si) deoxidizes steel. However, when the Si content is too high, the toughness of steel will be reduced. Therefore, Si content is 0.050 to 1.00%. The lower limit of Si content is preferably 0.10%, and further preferably 0.15%. The upper limit of Si content is preferably 0.80%, and more preferably 0.60%.

Mn: 0.10 to 1.50%

Manganese (Mn) deoxidizes steel in the same way as Si does as described above. Further, Mn strengthens steel. However, when the Mn content is too high, stress corrosion cracking resistance will be reduced. Therefore, the Mn content is 0.10 to 1.50%. The lower limit of the Mn content is preferably 0.13%, and more preferably 0.15%. The upper limit of the Mn content is preferably 1.40%, and more preferably 1.30%.

P: not more than 0.040%

Phosphorus (P) is an impurity. Phosphorus deteriorates hot workability and increases hot cracking susceptibility. Therefore, the P content is preferably as low as possible. The P content is not more than 0.040%. The P content is preferably not more than 0.030%, and more preferably not more than 0.025%.

S: not more than 0.0100%

Sulfur (S) is an impurity. Sulfur deteriorates, in the same way as P, hot workability as well as increases hot cracking susceptibility during welding. Therefore, the S content is preferably as low as possible. The S content is not more than 0.0100%. The S content is preferably not more than 0.0050%, and more preferably not more than 0.0020%.

Ni: 0.50 to 10.00%

Cu: 0.01 to 2.00%

Both nickel (Ni) and copper (Cu) improve the toughness of the base material and the corrosion resistance thereof under a wet carbon-dioxide gas environment. However, when the contents of these elements are too high, the effects thereof will be saturated, resulting in increase in production cost. Therefore, the Ni content is preferably 0.50 to 10.00%, and the Cu content is preferably 0.01 to 2.00%. The lower limit of the Hi content is preferably 1.00%, and more preferably 2.00%. The upper limit of the Ni content is preferably 9.50%, and more preferably 9.00%. The lower limit of the Cu content is preferably 0.013%, and more preferably 0.015%. The upper limit of the Cu content is preferably 1.95%, and more preferably 1.00%, Cr: 10.50 to 14.00%

Chromium (Cr) improves corrosion resistance of steel under a carbon dioxide gas environment. On the other hand, when the Cr content is too high, it is difficult to adjust the strength of steel. Therefore, the Cr content is 10.50 to 14.00. The lower limit of the Cr content is preferably 11.00%, and more preferably 11.50%. The upper limit of the Cr content is preferably 13.80%, and more preferably 13.50%.

Mo: 0.10 to 4.00%

W: 0.20 to 6.00%

Molybdenum (Mo) and Tungsten (W) improve the corrosion resistance and stress corrosion cracking resistance of steel under a wet carbon-dioxide gas environment. However, when the contents of these elements are too high, the above described effects will be saturated, resulting in increase in production cost. Therefore, the Mo content is 0.10 to 4.00%, and the W content is 0.20 to 6.00%. The lower limit of the Mo content is preferably 0.30%, and more preferably 0.50%. The upper limit of the Mo content is preferably 3.60%, and more preferably 3.50%. The lower limit of the W content is preferably 0.30%, and more preferably 0.50%. The upper limit of the W content is preferably 5.50%, and more preferably 5.00%. The base material, contains more than one of Mo and W.

Sol. Al: not more than 0.040%

Aluminum (Al) deoxidizes steel in the same way as Si does. However, when the Al content is too high, aluminum nitride (AlN) will be formed, thereby deteriorating the toughness and corrosion resistance of steel. Therefore, the sol. Al content is not more than 0.040%. The lower limit of the sol. Al content is preferably 0.003%, and more preferably 0.005%. The upper limit of the sol. Al content is preferably 0.035%, and more preferably 0.030%.

N: not more than 0.1%

When the base material is a martensitic stainless steel, nitrogen (N) is an impurity. N deteriorates the toughness of steel. Therefore, the N content is preferably as low as possible. The N content is not more than 0.1%.

The balance of the base material is Fe and impurities. The term "impurity" herein refers to elements which are mixed in from ores and scraps which are used as the raw material of steel, or due to various factors in the production process.

[Case in which the Base Material is Duplex Stainless Steel]

When the base material is a duplex stainless steel, preferably the base material has the following chemical composition.

C: not more than 0.03%

Carbon (C) stabilizes austenite. However, when the C content is too high, carbides are likely to precipitate, thereby deteriorating corrosion resistance. Therefore, the C content is not more than 0.03%. The upper limit of the C content is preferably 0.025%, and more preferably 0.02%.

Si: 0.20 to 1.00%

Silicon (Si) reduces the reduction in the flowability of molten metal during welding and the occurrence of a welding defect. However, when the Si content is too high, intermetallic compounds exemplified by sigma phase (σ phase) are likely to be produced. Therefore, the Si content is 0.20 to 1.00%. The lower limit of the Si content is preferably 0.25%, and more preferably 0.30%. The upper limit of the Si content is preferably 0.80%, and more preferably 0.60%.

Mn: not more than 8.00%

Manganese (Mn) is an essential element. Manganese desulfurizes and deoxidizes steel, thereby improving hot workability of steel. Further, Mn increases the solubility of nitrogen (S). However, when the Mn content is too high, the corrosion resistance will be deteriorated. Therefore, the Mn content is not more than 8.00%. The lower limit of the Mn content is preferably 0.03%, and more preferably 0.05%. The upper limit of the Mn content is preferably 7.50%, and more preferably 5.00%.

P: not more than 0.040%

Phosphorus (P) is an impurity. Phosphorus deteriorates the corrosion resistance and toughness of steel. Therefore, the P content is preferably as low as possible. The P content is not more than 0.040%. The P content is preferably not more than 0.030%, and more preferably not more than 0.025%.

S: not more than 0.0100%

Sulfur (S) is an impurity. Sulfur deteriorates the hot workability of steel. Sulfur further forms sulfides. Since a sulfide acts as a starting point of pitting, it reduces the pitting resistance of steel. Therefore, the S content is preferably as low as possible. The S content is not more than 0.0100%. The S content is preferably not more than 0.0050%, and more preferably not more than 0.0020%.

Cu: 0.20 to 4.00%

Copper (Cu) strengthens a passivation film, thereby improving corrosion resistance including SCC resistance under a high-temperature chloride environment. Further, Cu ultrafinely precipitates in the base material during large heat input welding, thereby reducing the precipitation, of σ phase at ferrite/austenite phase boundaries. However, when the Cu content is too high, the hot workability of steel will be deteriorated. Therefore, the Cu content is 0.20 to 4.00%. The lower limit of the Cu content is preferably 0.23%, and more preferably 0.25%. The upper limit of the Cu content is preferably 3.50%, and more preferably 3.00%.

Ni: 4.00 to 8.00%

Nickel (Ni) stabilizes austenite. Further, Ni improves the toughness of steel, and also improves the corrosion resistance including SCC resistance of steel. However, when the Ni content is too high, intermetallic compounds exemplified by σ phase are likely to be produced. Therefore, the Ni content is made to be 4.00 to 8.00%. The lower limit of the Ni content is preferably 4.50%, and more preferably 5.00%. The upper limit of the hi content is preferably 7.80%, and more preferably 7.50%.

Cr: 20.0 to 30.0%

Chromium (Cr) improves the corrosion resistance of steel and improves the SCC resistance of steel especially in a high-temperature chloride environment. However, when the Cr content is too high, intermatallic compounds exemplified by σ phase will be produced. As a result of that, the voidability and also hot workability of steel are deteriorated. Therefore, the Cr content is 20.0 to 30.0%. The lower limit of the Cr content is preferably 21.0%, and more preferably 22.0%. The upper limit of the Cr content is preferably 29.0%, and more preferably 28.0%.

Mo: 0.50 to 4.00%
W: 0.01 to 4.00%

Molybdenum (Mo) and Tungsten (W) improve the corrosion resistance and stress corrosion cracking resistance of the base material under a wet carton-dioxide gas environment. However, when the Mo content is too high, intermetallic compounds exemplified by σ phase will be produced. As a result of that, the weldability as well as hot workability of steel is deteriorated. Therefore, the Mo content is 0.50 to 4.00%. When the W content is too high, its effect will be saturated, resulting in high production costs. Therefore, the W content is preferably 0.01 to 4.00%. It is noted that any one or more of these elements may be added singly or in combination.

N: 0.100 to 0.350%

Nitrogen (%) is a strong austenite forming element and improves the thermal stability and corrosion resistance of steel. The base material, which is a duplex stainless steel, contains Cr and Mo which are ferrite forming elements. Considering the balance between the amount of ferrite and the amount of austenite in the base material, the N content may be not less than 0.100%. However, when the N content is too high, blowholes, which are a welding defect, will occur. When the N content is too high, nitrides are more likely to be produced during welding, thereby deteriorating the toughness and corrosion resistance of steel. Therefore, the N content is 0.100 to 0.350%. The lower limit of the N content is preferably 0.130%, and more preferably 0.160%. The upper limit of the N content is preferably 0.340%, and more preferably 0.330%.

Sol. Al: not more than 0.040%

Aluminum (Al) is an essential element. Aluminium deoxidizes steel. On the other hand, when Al is excessively contained, aluminum nitride (AlN) will be formed, thereby deteriorating the toughness and corrosion resistance of steel. Therefore, the sol. Al content is not more than 0.040%. The lower limit of the sol. Al content is preferably 0.003%, and more preferably 0.005%. The upper limit of the sol. Al content is preferably 0.035%, and more preferably 0.030%.

The balance of the base material is Fe and impurities.

[Selective Elements in the Case in which the Base Material is Duplex Stainless Steel]

The base material, which is a duplex stainless steel, may contain, in place of Fe, one or more elements selected from at least one group of the following first to third groups. That is, the elements in the first to third groups are selective elements which can be contained as required.

First group: V: not more than 1.50%
Second group: Ca: not more than 0.0200%, Mg: not more than 0.0200%, and E: not more than 0.0200%
Third group: Rare earth metals (REM): not more than 0.2000%

Hereafter, these selective elements will be described in detail.

[First Group]

V: not more than 1.50%

Vanadium (V) is a selective element. Vanadium improves the corrosion resistance of steel, especially, the corrosion resistance under an acidic environment. To be more specific, when V is contained together with Mo and Cu, crevice corrosion resistance of steel will be improved. The above described effect will be achieved if V is contained even in a small amount. However, when the V content is too high, the amount of ferrite in steel, will excessively increase, deteriorating the corrosion resistance of steel. Therefore, the V content is not more than 1.50%. The upper limit of the V content is preferably 1.30%. The lower limit of the V content is preferably not less than 0.05%.

[Second Group]

Ca: not more than 0.0200%
Mg: not more than 0.0200%
B: not more than 0.0200%

All of Calcium (Ca), Magnesium (Mg), and Boron (B) are selective elements. All of Ca, Mg, and B immobilize S and O (oxygen) in steel, thereby improving the hot workability of steel. The S content in the base material is low. Therefore, the hot workability of steel is high even if Ca, Mg, and B are not contained. However, for example, when a seamless steel pipe is produced by a skew rolling method, even higher hot workability may be required. If one or more selected from the group consisting of Ca, Mg, and B are contained, even higher hot workability will be obtained. If any one of these elements is contained even in a small amount, the above described effect will be achieved.

However, when the contents of these elements are too high, non-metallic inclusions (such as oxides and sulfides of Ca, Mg, and B) will increase. Since a non-metallic inclusion acts as a starting point of pitting, it will deteriorate the corrosion, resistance of steel. Therefore, the Ca content is not more than 0.0200%, the Mg content is not more than 0.0200%, and the B content is not more than 0.0200%.

Preferably the content of at least one of, or the total content of two or more of, Ca, Mg, and B is not less than S (mass %)+½×O (mass %). In such a case, the above describe effect will be particularly effectively achieved.

When two or more of Ca, Mg, and B are contained, the total content of those elements is preferably not more than 0.04%. When all of Ca, Mg, and B are contained, the total content of those elements is preferably not more than 0.06%.

[Third Group]

Rare earth metals (REM): not more than 0.2000%

Rare earth metals (REM) are selective elements. REM immobilize S and O (oxygen) in steel in the same way as Ca, Mg, and B, thereby improving the hot workability of steel. However, when the REM content is too high, nonmetallic inclusions (such as oxides and sulfides of rare earth metals) will increase, thereby deteriorating the corrosion resistance of steel. Therefore, the REM content is not more than 0.2000%. To clearly achieve the above described effect, the REM content is preferably not less than S (mass %)+½×O (mass %). However, the above described effect can be achieved to some extent, if REM are contained even in a small amount.

REM is a generic term including 15 elements of lanthanoid, and Y and Sc. One or more of these elements are to be contained. The content of REM means the total content of the one or more of the afore-mentioned elements.

[Welding Process]

After the above described base material is prepared, the base material is subjected to GMA welding to form weld metal.

A welding material, whose chemical composition is adjusted so as to be able to obtain the chemical composition of the weld metal to be described later, is prepared. The welding material is, for example, a wire.

GMA welding is conducted using the prepared welding material. First, a GMA welding machine is prepared. The GMA welding machine includes a feed unit and a welding torch. The feed unit feeds shielding gas and welding material to the welding torch. The welding torch generates arc between the welding material (wire) and the base material. At this moment, the welding material is melted to form weld metal.

The shielding gas to be used for GMA welding comprises 1 to 2 volume % or 35 to 50 volume % of $CO_2$ gas, and the balance being inert gas. The inert gas is for example Ar. The shielding gas may comprise, other than the above described composition, impurities. By using the shielding gas having such a composition, the occurrence of blowholes is reduces as described above, and a molten metal having excellent strength and toughness is formed.

By the above described process, a welded joint including a base material and a weld metal is produced. The weld metal formed by the welding process is a duplex stainless steel, which has the following chemical composition.

C: not more than 0.080%

Carbon (C) stabilizes austenite in the weld metal. On the other hand, when the C content is too nigh, carbides are likely to precipitate, thereby deteriorating corrosion resistance. Therefore, the C content is not more than 0.080%. The upper limit of the C content is preferably 0.075%, and more preferably 0.070%.

Si: 0.20 to 1.00%

Silicon (Si) deoxidizes the molten metal during welding. Further, Si increases the strength of the weld metal. On the other hand, when the Si content is too high, the toughness of the weld metal will be deteriorated. Therefore, the Si content is 0.20 to 1.00%. The lower limit of the Si content is preferably 0.25%, and more preferably 0.30%. The upper limit of the Si content is preferably 0.80%, and more preferably 0.60%.

Mn: not more than 8.00%

Manganese (Mn) is an essential element. Manganese deoxidizes the molten metal during welding. Further, Mn increases the strength of the weld metal. On the other hand, when the Mn content is too high, the corrosion resistance of the weld metal will be deteriorated. Therefore, the Mn content is not more than 6.00%. The lower limit of the Mn content is preferably 0.25%, and more preferably 0.50%. The upper limit of the Mn content is preferably 7.00%, and more preferably 6.00%.

P: not more than 0.040%

Phosphorus (P) is an impurity. Phosphorus deteriorates the toughness of the weld metal, and increases the hot cracking susceptibility of the weld metal. Therefore, the P content is preferably as low as possible. The P content is not more than 0.040%. The P content is preferably not more than 0.030%, and more preferably not more than 0.020%.

S: not more than 0.0100%

Sulfur (S) is an impurity. Sulfur deteriorates the ductility and corrosion resistance of the weld metal, and increases the hot cracking susceptibility of the weld metal. Therefore, the S content is preferably as low as possible. The S content is not more than 0.0100%. The S content is preferably not more than 0.005%, and more preferably not more than 0.002%.

Cu: not more than 2.0%

Copper (Cu) is an essential element. Copper strengthens a passivation film and improves the corrosion resistance including SCC resistance under a high-temperature chloride environment. On the other hand, when the Cu content is too high, the hot cracking susceptibility of the weld metal is increased. Therefore, the Cu content is not more than 2.0%. The Cu content is preferably less than 2.0%. The lower limit of the Cu content is preferably 0.1%, and more preferably 0.15%. The upper limit of the Cu content is preferably 1.0%, and more preferably 0.8%.

Ni: 7.00 to 12.00%

Nickel (Ni) stabilizes austenite in the weld metal, thereby improving the toughness of the weld metal. On the other hand, when the hi content is too high, the amount of ferrite in the weld metal excessively decreases, making it difficult to obtain fundamental mechanical properties of the duplex stainless steel. Further, when the Ni content is too high, σ phase is more likely to precipitate. Therefore, the Ni content is 7.00 to 12.00%. The lower limit of the Ni content is preferably 8.00%, and more preferably the Ni content is higher than 8.00%. The upper limit of the Ni content is preferably 11.00%, and more preferably 10.00%.

Cr: 20.0 to 30.0%

Chromium (Cr) improves the corrosion resistance of the weld metal and particularly improves the SCC resistance of the weld metal in a high-temperature chloride environment. On the other hand, when the Cr content is too high, σ phase is more likely to precipitate. Therefore, the Cr content is 20.0 to 30.0%. The lower limit of the Cr content is preferably 21.0%. The upper limit of the Cr content is preferably 29.0%, and more preferably 28.0%.

Mo: 1.00 to 4.00%

W: 1.00 to 4.00%

Molybdenum (Mo) and Tungsten (W) improve the corrosion resistance and stress corrosion cracking resistance of the base material under a wet carbon-dioxide gas environment. On the other hand, when the Mo content is too high, sigma phase (σ phase) is more likely to precipitate in the weld metal. Therefore, the Mo content is 1.00 to 4.00%. When the W content is too high, its effect will be saturated, and any further content will only lead to cost increase. Therefore, the W content is 1.00 to 4.00%. The weld metal according to the present embodiment contains at least one or more of Mo and W.

N: 0.100 to 0.350%

Nitrogen (N) increases the strength of steel by solid-solution strengthening. Further, N is a strong austenite forming element, and improves the corrosion resistance of the weld metal. On the other hand, when the N content is too high, blowholes, which are a welding defect, will occur. Therefore, the N content is 0.100 to 0.350%. The upper limit of the N content is preferably 0.300%, and more preferably 0.250%.

Sol. Al: not more than 0.040%

Aluminum (Al) is an essential element. Al deoxidizes the molten metal during welding. On the other hand, when sol.

Al content is too high, Al forms coarse oxide-based inclusions, thereby deteriorating the toughness of the weld metal. Therefore, the sol. Al content is not more than 0.040%. The lower limit of the sol. Al content is preferably 0.003%, and more preferably 0.005%. The upper limit of the sol. Al content is preferably 0.035%, and more preferably 0.030%.

O (oxygen): 0.02 to 0.14% of blowholes in the weld metal of the welded joint produced is reduced to be low, and thereby excellent strength and toughness are achieved.

Examples

A plurality of base materials (steel plates) each having a chemical composition shown in Table 1 and a thickness of 10 to 30 mm were prepared.

TABLE 1

| Base material No. | Chemical composition (unit: mass %, balance Fe and impurities) | | | | | | | | | | | | |
|---|---|---|---|---|---|---|---|---|---|---|---|---|---|
| | C | Si | Mn | P | S | Cu | Ni | Cr | Mo | W | N | sol. Al | Others |
| 1 | 0.014 | 0.52 | 0.97 | 0.021 | 0.0002 | 2.44 | 5.03 | 25.00 | 1.10 | 0.03 | 0.1890 | 0.014 | 0.0023% B and 0.0023% Ca |
| 2 | 0.023 | 0.45 | 1.20 | 0.023 | <0.001 | 0.30 | 5.16 | 22.86 | 3.18 | 0.05 | 0.1764 | 0.010 | 0.01% V and 0.001% REM |
| 3 | 0.016 | 0.30 | 0.48 | 0.024 | 0.0002 | 0.61 | 6.64 | 24.84 | 3.10 | 2.12 | 0.2864 | 0.012 | — |
| 4 | 0.014 | 0.26 | 0.35 | 0.011 | 0.0005 | 0.02 | 6.54 | 12.04 | 2.45 | — | 0.0120 | 0.030 | — |
| 5 | 0.006 | 0.22 | 0.45 | 0.017 | 0.0006 | 0.05 | 6.56 | 12.08 | 2.43 | — | 0.0058 | 0.030 | — |

Oxygen (O) is an impurity. Oxygen forms oxide-based inclusions, thereby deteriorating the toughness of the weld metal. Therefore, the O content is preferably as low as possible.

However, in GMA welding, in contrast to in GTA welding, when oxygen component is not contained in the shielding gas, the arc will not be stabilized so that, a sound weld metal cannot be obtained. Since, in the present embodiment, GMA welding is conducted, not less than 0.02% of oxygen will be contained in the weld metal.

The balance of the weld metal of the present embodiment is Fe and impurities.

[Strength, Toughness, and Number of Blowholes]

The weld metal which is produced by the above described production method will have a tensile strength of not less than 700 MPa, and exhibit absorbed energy at −30° C. of not less than 27 J. Further, the number of blowholes having a size of not less than 0.5 mm will be not more than 5 pieces/100 mm.

Figure 3:
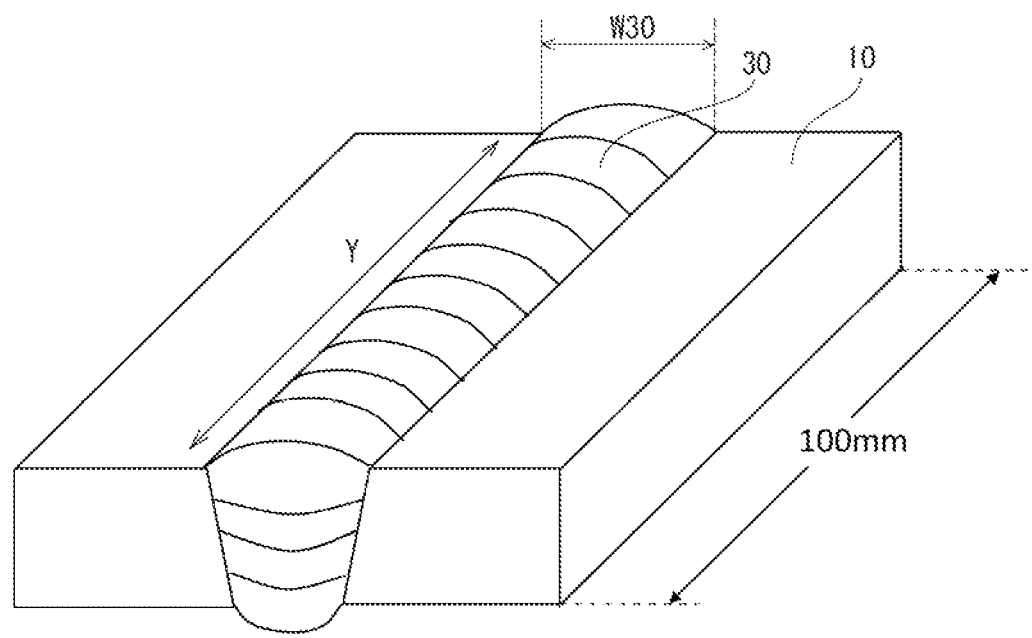
FIG. 3 is a perspective view of a welded joint, for illustrating a method for measuring blowholes.

The method for measuring blowholes is as follows. Referring to FIG. 3, a region having a range of 100 mm in an axial direction Y (lengthwise direction, that is, the direction in which the weld metal extends) of weld metal 30 of a welded joint 10 (that is, the area of the region is 100 mm in the axial direction×weld metal width W30 (mm)) is selected. The selected region is subjected to a radiation transmission test based on JIS Z3104 to acquire a transmission image. In the acquired transmission image, the number of blowholes having a size of not less than 0.5 mm is counted. Where, "blowholes having a sire of not less than 0.5 mm" means those whose maximum diameter (major axis) is not less than 0.5 mm among the blowholes in the transmission image.

Preferably, the thickness of the base material (plate thickness or wall thickness) is 5 to 50 mm. Particularly in this thickness range, the above described production method, makes it possible to keep the number of blowholes in the weld metal to be low.

In the process for producing weld metal according to the present embodiment, GMA welding is conducted by using a shielding gas containing a certain content of $CO_2$ gas and inert gas as described above. As a result of this, the number The base materials for Base material Nos. 1 to 3 were each a duplex stainless steel. The duplex stainless steel was either of a so-called super duplex stainless steel and a duplex stainless steel (JIS SUS329J2L equivalent) for use in oil well pipes and line pipes for oil-related facilities. Base material Nos. 4 and 5 were each a martensitic stainless steel, specifically a 13 Cr steel for use in oil-related facilities. The chemical compositions of each base material were all within the range of the above described preferable chemical composition.

The base material of each Base material No. was provided with a bevel, and subjected to GMA welding at a welding condition shown in Table 2 to obtain a welded joint of each Joint No., which included a weld metal of a chemical composition shown in Table 3. The welding consumables were all a wire rod having an outer diameter of 1.2 mm. The welding conditions were varied and set such that heat input was 8 kJ/cm.

TABLE 2

| Welded joint | Base material | Plate thickness | Shielding gas composition ratio | |
|---|---|---|---|---|
| No. | No. used | (mm) | $CO_2$ | Ar |
| 1-1 | 1 | 10 | 2 | 98 |
| 1-2 | 1 | 10 | 40 | 60 |
| 1-3 | 1 | 10 | 2 | 98 |
| 1-4 | 1 | 10 | 2 | 98 |
| 1-5 | 1 | 20 | 40 | 60 |
| 2-1 | 2 | 10 | 2 | 98 |
| 2-2 | 2 | 10 | 2 | 98 |
| 2-3 | 2 | 10 | 40 | 60 |
| 2-4 | 2 | 10 | 50 | 50 |
| 3-1 | 3 | 10 | 2 | 98 |
| 3-2 | 3 | 10 | 35 | 65 |
| 4-1 | 4 | 10 | 50 | 50 |
| 4-2 | 4 | 30 | 2 | 98 |
| 5-1 | 5 | 10 | 1 | 99 |
| 1-6 | 1 | 10 | 25 | 75 |
| 1-7 | 1 | 10 | 30 | 70 |
| 1-8 | 1 | 10 | 2 | 98 |
| 2-5 | 2 | 10 | 10 | 90 |
| 2-6 | 2 | 10 | 0 | 100 |
| 3-3 | 3 | 10 | 5 | 95 |
| 3-4 | 3 | 10 | 55 | 45 |

TABLE 2-continued

| Welded joint No. | Base material No. used | Plate thickness (mm) | Shielding gas composition ratio | |
|---|---|---|---|---|
| | | | CO$_2$ | Ar |
| 4-3 | 4 | 10 | 20 | 90 |
| 4-4 | 4 | 10 | 2 | 98 |
| 4-5 | 4 | 10 | 3 | 97 |
| 5-2 | 5 | 10 | 1 | 99 |
| 5-3 | 5 | 10 | 60 | 40 |
| 5-4 | 5 | 10 | 2 | 98 |

TABLE 3

| | Joint No. | Base material No. | Chemical composition (unit: mass %, balance being Fe and impurities) | | | | | | | | | | | |
|---|---|---|---|---|---|---|---|---|---|---|---|---|---|---|
| | | | C | Si | Mn | P | S | Cu | Ni | Cr | Mo | W | N | Sol. Al | O |
| Inventive examples | 1-1 | 1 | 0.020 | 0.37 | 1.41 | 0.011 | 0.002 | 0.42 | 8.06 | 22.59 | 2.66 | 0.01 | 0.132 | 0.012 | 0.034 |
| | 1-2 | 1 | 0.032 | 0.29 | 0.54 | 0.006 | 0.002 | 0.77 | 8.28 | 25.78 | 2.72 | 1.74 | 0.238 | 0.015 | 0.125 |
| | 1-3 | 1 | 0.022 | 0.41 | 1.57 | 0.013 | 0.002 | 0.32 | 8.21 | 22.20 | 2.75 | — | 0.103 | 0.011 | 0.072 |
| | 1-4 | 1 | 0.035 | 0.35 | 0.56 | 0.007 | 0.002 | 0.72 | 8.99 | 25.50 | 2.83 | 1.85 | 0.177 | 0.007 | 0.066 |
| | 1-5 | 1 | 0.072 | 0.31 | 0.54 | 0.006 | 0.002 | 0.65 | 8.22 | 25.25 | 2.75 | 1.88 | 0.212 | 0.008 | 0.132 |
| | 2-1 | 2 | 0.022 | 0.42 | 1.64 | 0.011 | 0.002 | 0.31 | 8.09 | 22.40 | 3.02 | 0.01 | 0.101 | 0.013 | 0.025 |
| | 2-2 | 2 | 0.033 | 032 | 0.62 | 0.008 | 0.001 | 0.48 | 8.64 | 25.33 | 3.01 | 1.80 | 0.175 | 0.009 | 0.041 |
| | 2-3 | 2 | 0.061 | 0.44 | 1.61 | 0.012 | 0.002 | 0.22 | 8.12 | 22.40 | 3.02 | 0.01 | 0.101 | 0.009 | 0.128 |
| | 2-4 | 2 | 0.075 | 0.35 | 0.78 | 0.009 | 0.001 | 0.42 | 8.64 | 25.33 | 3.05 | 1.85 | 0.175 | 0.008 | 0.131 |
| | 3-1 | 3 | 0.031 | 0.28 | 0.52 | 0.005 | 0.002 | 0.42 | 8.76 | 25.67 | 2.99 | 2.03 | 0.177 | 0.014 | 0.052 |
| | 3-2 | 3 | 0.044 | 0.31 | 1.51 | 0.012 | 0.001 | 0.44 | 8.06 | 22.50 | 2.81 | 0.01 | 0.178 | 0.012 | 0.128 |
| | 4-1 | 4 | 0.025 | 0.26 | 1.47 | 0.006 | 0.002 | 0.31 | 8.05 | 21.65 | 2.89 | 0.02 | 0.110 | 0.003 | 0.137 |
| | 4-2 | 4 | 0.041 | 0.33 | 0.58 | 0.007 | 0.001 | 0.41 | 8.55 | 25.10 | 3.03 | 1.66 | 0.181 | 0.009 | 0.042 |
| | 5-1 | 5 | 0.034 | 0.30 | 0.55 | 0.007 | 0.002 | 0.45 | 8.89 | 25.53 | 2.94 | 1.66 | 0.166 | 0.009 | 0.022 |
| Comparative examples | 1-6 | 1 | 0.062 | 0.41 | 1.51 | 0.011 | 0.002 | 3.42 | 8.11 | 22.41 | 2.71 | 0.01 | 0.112 | 0.010 | 0.115 |
| | 1-7 | 1 | 0.077 | 0.29 | 0.51 | 0.006 | 0.002 | 0.71 | 8.81 | 25.10 | 2.75 | 1.74 | 0.199 | 0.007 | 0.121 |
| | 1-8 | 1 | 0.031 | 0.49 | 1.52 | 0.010 | 0.003 | 2.61 | 8.38 | 20.40 | 2.03 | 0.01 | 0.116 | 0.008 | 0.051 |
| | 2-5 | 2 | 0.042 | 0.31 | 0.58 | 0.007 | 0.002 | 0.49 | 12.8 | 25.40 | 2.97 | 1.92 | 0.178 | 0.010 | 0.073 |
| | 2-6 | 2 | 0.015 | 0.32 | 0.52 | 0.008 | 0.001 | 0.71 | 8.55 | 25.12 | 2.92 | 1.81 | 0.171 | 0.012 | 0.008 |
| | 3-3 | 3 | 0.030 | 0.28 | 0.50 | 0.010 | 0.002 | 0.46 | 4.02 | 25.60 | 3.10 | 2.13 | 0.167 | 0.018 | 0.066 |
| | 3-4 | 3 | 0.035 | 0.28 | 0.50 | 0.005 | 0.002 | 3.51 | 8.61 | 25.65 | 3.10 | 2.03 | 0.177 | 0.005 | 0.147 |
| | 4-3 | 4 | 0.055 | 0.30 | 0.51 | 0.007 | 0.002 | 0.43 | 9.03 | 25.53 | 2.91 | 1.73 | 0.166 | 0.019 | 0.104 |
| | 4-4 | 4 | 0.048 | 0.50 | 0.53 | 0.006 | 0.002 | 0.42 | 8.66 | 25.50 | 4.54 | 1.83 | 0.169 | 0.003 | 0.044 |
| | 4-5 | 4 | 0.033 | 0.30 | 0.54 | 0.006 | 0.002 | 0.43 | 8.85 | 25.53 | 3.02 | 1.67 | 0.166 | 0.013 | 0.051 |
| | 5-2 | 5 | 0.052 | 0.32 | 0.51 | 0.007 | 0.002 | 0.31 | 8.88 | 32.80 | 3.01 | 1.92 | 0.175 | 0.010 | 0.031 |
| | 5-3 | 5 | 0.071 | 0.32 | 0.52 | 0.008 | 0.001 | 0.28 | 9.01 | 25.10 | 2.88 | 1.88 | 0.154 | 0.005 | 0.152 |
| | 5-4 | 5 | 0.023 | 0.40 | 1.51 | 0.006 | 0.001 | 0.22 | 12.2 | 22.20 | 2.15 | 0.01 | 0.020 | 0.010 | 0.028 | middle of the parallel portion of each specimen and, on both sides thereof, a welding heat affected zone and the base material were located in that order. The tension test was conducted at room temperature (25° C.) to obtain tensile strength (MPa).

[Area Fraction Measurement Test of σ Phase]

The cross section of each welded joint was subjected to mirror polishing and etching. After etching, the weld metal in the etched cross section was subjected to image analysis by using an optical microscope having a magnification of 500. The area of the weld metal used for the image analysis was 4000 μm$^2$ per one visual field. The image analysis was conducted for 4 visual fields. The area fraction (%) of σ phase in the weld metal in each visual field was determined by the image analysis. An average of area fractions of σ phase for four visual fields was defined as the area fraction (%) of σ phase for each Joint No. When the area fraction of σ phase was not less than 0.5%, it was judged that σ phase had precipitated. When the area fraction of σ phase was less than 0.5%, it was judged that σ phase had not precipitated.

[Hot Cracking Test]

A specimen for microstructure observation of a cross section perpendicular to the weld line was collected from each welded joint. The surface of the collected specimen was subjected to mirror polishing and etching. The surface of the etched specimen was observed by using an Optical microscope having a magnification of 500. Then, it was judged by visual inspection whether or not hot cracking had occurred in the weld metal.

[Test Results]

Table 4 shows the results of the above described evaluation tests.

By using thus produced welded joints of each Joint Nos., the following evaluation tests were conducted.

[Blowhole Measurement Test]

After welding, the weld metal of the welded joint of each Joint No. was subjected to the above described radiation transmission test to count the number of blowholes (/100 mm).

[Charpy Impact Test]

Figure 4:
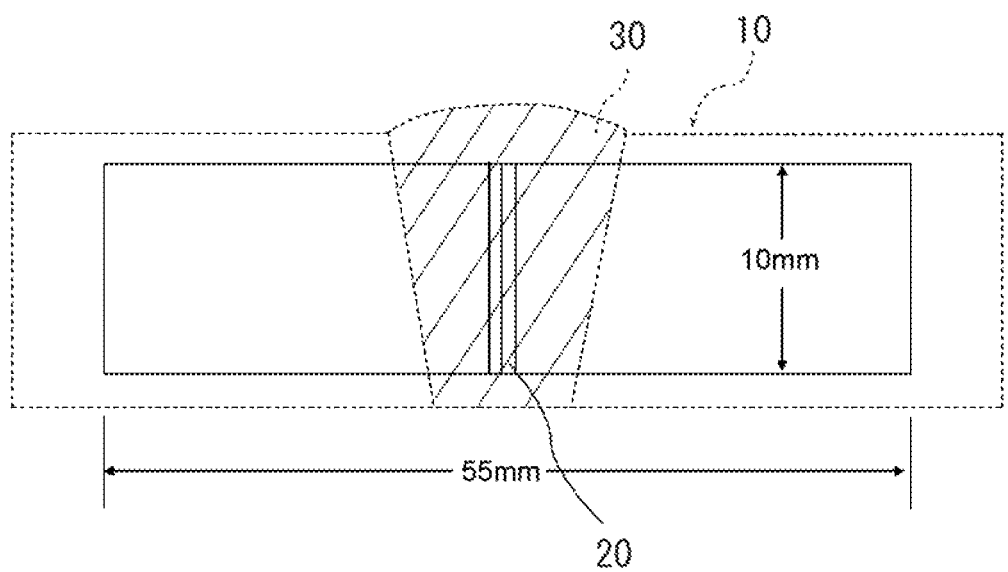
FIG. 4 is a diagram showing the location where a Charpy impact specimen is collected from a welded joint.

The toughness of the weld metal of each welded joint was evaluated by the following method. A Charpy impact specimen (V-notch specimen) shown in FIG. 4 was collected from each welded joint. As shown in FIG. 4, a V-notch 20 of each specimen was located in a central portion of a weld metal 30 of a welded joint 10. The V-notch specimen had a width of 10 mm, a thickness of 10 mm, a length of 53 mm, and a notch depth of 2 mm.

By using the V-notch specimen, the Charpy impact test was conducted at −30° C. based on JIS Z2242 to determine absorbed energy.

[Tension Test]

A No. 5 test coupon specified in JIS Z2201 was collected from each welded joint. The lengthwise direction, of the specimen was perpendicular to the welding proceeding direction. Moreover, the weld metal was located in the

TABLE 4

| Joint No. | Hot cracking | Amount of oxygen (%) | Absorbed energy (J) | Number of blowholes (/100 mm) | Tensile strength (MPa) | σ phase | Remarks |
|---|---|---|---|---|---|---|---|
| 1-1 | Absent | 0.034 | 105 | 1 | 820 | Absent | Inventive examples |
| 1-2 | Absent | 0.125 | 33 | 1 | 902 | Absent | Inventive examples |
| 1-3 | Absent | 0.072 | 91 | 2 | 816 | Absent | Inventive examples |
| 1-4 | Absent | 0.066 | 96 | 0 | 910 | Absent | Inventive examples |
| 1-5 | Absent | 0.132 | 38 | 1 | 908 | Absent | Inventive examples |
| 2-1 | Absent | 0.025 | 120 | 2 | 832 | Absent | Inventive examples |
| 2-2 | Absent | 0.041 | 108 | 1 | 897 | Absent | Inventive examples |
| 2-3 | Absent | 0.128 | 34 | 2 | 788 | Absent | Inventive examples |
| 2-4 | Absent | 0.131 | 30 | 0 | 917 | Absent | Inventive examples |
| 3-1 | Absent | 0.052 | 110 | 2 | 921 | Absent | Inventive examples |
| 3-2 | Absent | 0.128 | 33 | 4 | 801 | Absent | Inventive examples |
| 4-1 | Absent | 0.137 | 30 | 1 | 905 | Absent | Inventive examples |
| 4-2 | Absent | 0.042 | 111 | 2 | 899 | Absent | Inventive examples |
| 5-1 | Absent | 0.022 | 121 | 1 | 911 | Absent | Inventive examples |
| 1-6 | Present | 0.115 | 46 | 8 | 811 | Absent | Comparative examples |
| 1-7 | Absent | 0.121 | 37 | 7 | 899 | Absent | Comparative examples |
| 1-8 | Present | 0.051 | 22 | 1 | 821 | Absent | Comparative examples |
| 2-5 | Absent | 0.073 | 20 | 30 | 902 | Present | Comparative examples |
| 2-6 | Absent | 0.008 | — | 22 | — | Absent | Comparative examples |
| 3-3 | Absent | 0.068 | 25 | 10 | 911 | Absent | Comparative examples |
| 3-4 | Present | 0.147 | 15 | 0 | 883 | Absent | Comparative examples |
| 4-3 | Absent | 0.104 | 55 | 15 | 899 | Absent | Comparative examples |
| 4-4 | Absent | 0.044 | 25 | 0 | 901 | Present | Comparative examples |
| 4-5 | Absent | 0.051 | 99 | 9 | 888 | Absent | Comparative examples |
| 5-2 | Absent | 0.031 | 23 | 1 | 897 | Present | Comparative examples |
| 5-3 | Absent | 0.152 | 14 | 0 | 902 | Absent | Comparative examples |
| 5-4 | Absent | 0.028 | 130 | 0 | 650 | Absent | Comparative examples |

Referring to Table 4, the composition of the shielding gas was appropriate for Joint Nos. 1-1 to 1-5, 2-1 to 2-4, 3-1 to 3-2, 4-1 to 4-2, and 5-1. Accordingly, as shown in Table 3, for those Joint Nos., the chemical compositions of weld metal were appropriate. Further, the number of blowholes was not more than 5 pieces/100 mm. Further, tensile strength was not less than 700 MPa, the absorbed energy at −30° C. was not less than 27 J. Furthermore, neither sigma phase nor hot cracking was observed.

On the other hand, in Joint No. 1-6, the Cu content in the weld metal was high. Accordingly, hot cracking was observed. Further, the $CO_2$ content in the shielding gas was not appropriate. Accordingly, the number of blowholes exceeded 5 pieces/100 mm.

In Joint No. 1-7, the chemical composition of the weld metal was appropriate. However, the $CO_2$ content in the shielding gas was not appropriate. Accordingly, the number of blowholes exceeded 5 pieces/100 mm.

In Joint No. 1-8, the Cu content in the weld metal was high. Accordingly, hot cracking was observed. Further, the Ni content was low. Accordingly, the absorbed energy was low.

In Joint No. 2-5, the Ni content in the weld metal was high. Accordingly, the absorbed energy was low, and σ phase was observed. Further, the $CO_2$ content in the shielding gas was not appropriate. Accordingly, the number of blowholes exceeded 5 pieces/100 mm.

In Joint No. 2-6, $CO_2$ was not contained in the shielding gas. Accordingly, the number of blowholes exceeded 5 pieces/100 mm. Note that the oxygen content in the weld metal of each of Joint Nos. 2-6 was low.

In Joint No. 3-3, the Ni content was low. As a result, the absorbed, energy was low. Further, the $CO_2$ content in the shielding gas was not appropriate. As a result, the number of blowholes exceeded 5 pieces/100 mm.

In Joint No. 3-4, the Cu content was high. Accordingly, hot cracking was observed. Further, the $CO_2$ content in the shielding gas was too high. Accordingly, the oxygen content in the weld metal, was high, and the absorbed energy was low.

In Joint No. 4-3, although the chemical composition of the weld metal was appropriate, the $CO_2$ content in the shielding gas was not appropriate. Accordingly, the number of blowholes exceeded 5 pieces/100 mm.

In Joint No. 4-4, the Mo content was high. Accordingly, σ phase was observed. Further, the absorbed energy was low. The toughness was low presumably because σ phase was produced.

In Joint No. 4-5, although the chemical composition of the weld, metal was appropriate, the $CO_2$ content in the shielding gas was not appropriate. Accordingly, the number of blowholes exceeded 5 pieces/100 mm.

In Joint No. 5-2, the Cr content was high. Accordingly, σ phase was observed. Further, the absorbed energy was low. The toughness was low presumably because σ phase was produced.

In Joint No. 5-3, the $CO_2$ content in the shielding gas was too high. Accordingly, the oxygen content in the weld metal was high, and the absorbed energy was low.

In Joint No. 5-4, the Ni content in the weld metal was high, and the 11 content was low. Accordingly, the weld metal of Joint No. 5-4 was not a duplex stainless steel, but an austenitic stainless steel. In Joint No. 5-4, since the N content was low, blowholes were suppressed; however, the tensile strength was as low as less than 700 MPa.

Although embodiments of the present invention have been described so far, the above described embodiments are merely examples for carrying out the present invention. Therefore, the present invention will not be limited to the above described embodiments, and can be carried out by appropriately modifying the above described embodiments within the range not departing from the spirit thereof.

The invention claimed is:

1. A process for producing a welded joint, comprising the steps of:

preparing a base material comprising, by mass %, not less than 10.5% of Cr; and subjecting the base material to GMA (Gas Metal Arc) welding using a shielding gas comprising 1 to 2 volume % or 35 to 50 volume % of $CO_2$, and the balance being inert gas, thereby forming a weld metal comprising, by mass %, C: not more than 0.080%, Si: 0.20 to 1.00%, Mn: not more than 8.00%, P: not more than 0.040%, S: not more than 0.0100%, Cu: not more than 2.0%, Cr: 20.0 to 30.0%, Ni: 7.00 to 12.00%, N: 0.100 to 0.350%, O (oxygen): 0.02 to 0.14%, sol. Al: not more than 0.040%, at least one of Mo: 1.00 to 4.00% and W: 1.00 to 4.00%, and the balance being Fe and impurities.

2. The process for producing the welded joint according to claim 1, wherein the base material is a martensitic stainless steel comprising, by mass %, C: 0.001 to 0.100%, Si: 0.050 to 1.00%, Mn: 0.10 to 1.50%, P: not more than 0.040%, S: not more than 0.0100%, Cu: 0.01 to 2.00%, Cr: 10.50 to 14.00%, Ni: 0.50 to 10.00%, N: not more than 0.1%, sol. Al: not more than 0.040%, at least one of Mo: 0.10 to 4.00% and W: 0.20 to 6.00%, and the balance being Fe and impurities.

3. The process for producing the welded joint according to claim 1, wherein the base material is a duplex stainless steel comprising, by mass %, C: not more than 0.03%, Si: 0.20 to 1.00%, Mn: not more than 8.00%, P: not more than 0.040%, S: not more than 0.0100%, Cu: 0.20 to 4.00%, Cr: 20.0 to 30.0%, Ni: 4.00 to 8.00%, N: 0.100 to 0.350%, sol. Al: not more than 0.040%, at least one of Mo: 0.50 to 4.00% and W: 0.01 to 4.00%, and the balance being Fe and impurities.

4. The process for producing the welded joint according to claim 3, wherein the base material further comprises, in place of a part of the Fe, rare earth metals (REM): not more than 0.2000%.

5. The process for producing the welded joint according to claim 3, wherein the base material further comprises, in place of a part of the Fe, at least one selected from a group consisting of Ca: not more than 0.0200%, Mg: not more than 0.0200%, and B: not more than 0.0200%.

6. The process for producing the welded joint according to claim 5, wherein the base material further comprises, in place of a part of the Fe, rare earth metals (REM): not more than 0.2000%.

7. The process for producing the welded joint according to claim 3, wherein the base material further comprises V: not more than 1.50% in place of a part of the Fe.

8. The process for producing the welded joint according to claim 7, wherein the base material further comprises, in place of a part of the Fe, rare earth metals (REM): not more than 0.2000%.

9. The process for producing the welded joint according to claim 7, wherein the base material further comprises, in place of a part of the Fe, at least one selected from a group consisting of Ca: not more than 0.0200%, Mg: not more than 0.0200%, and B: not more than 0.0200%.

10. The process for producing the welded joint according to claim 9, wherein the base material further comprises, in place of a part of the Fe, rare earth metals (REM): not more than 0.2000%.

* * * * *